Jan. 1, 1952 — C. E. FRANK — 2,580,383
VEHICLE WHEEL SUPPORT
Filed Feb. 24, 1948 — 2 SHEETS—SHEET 1
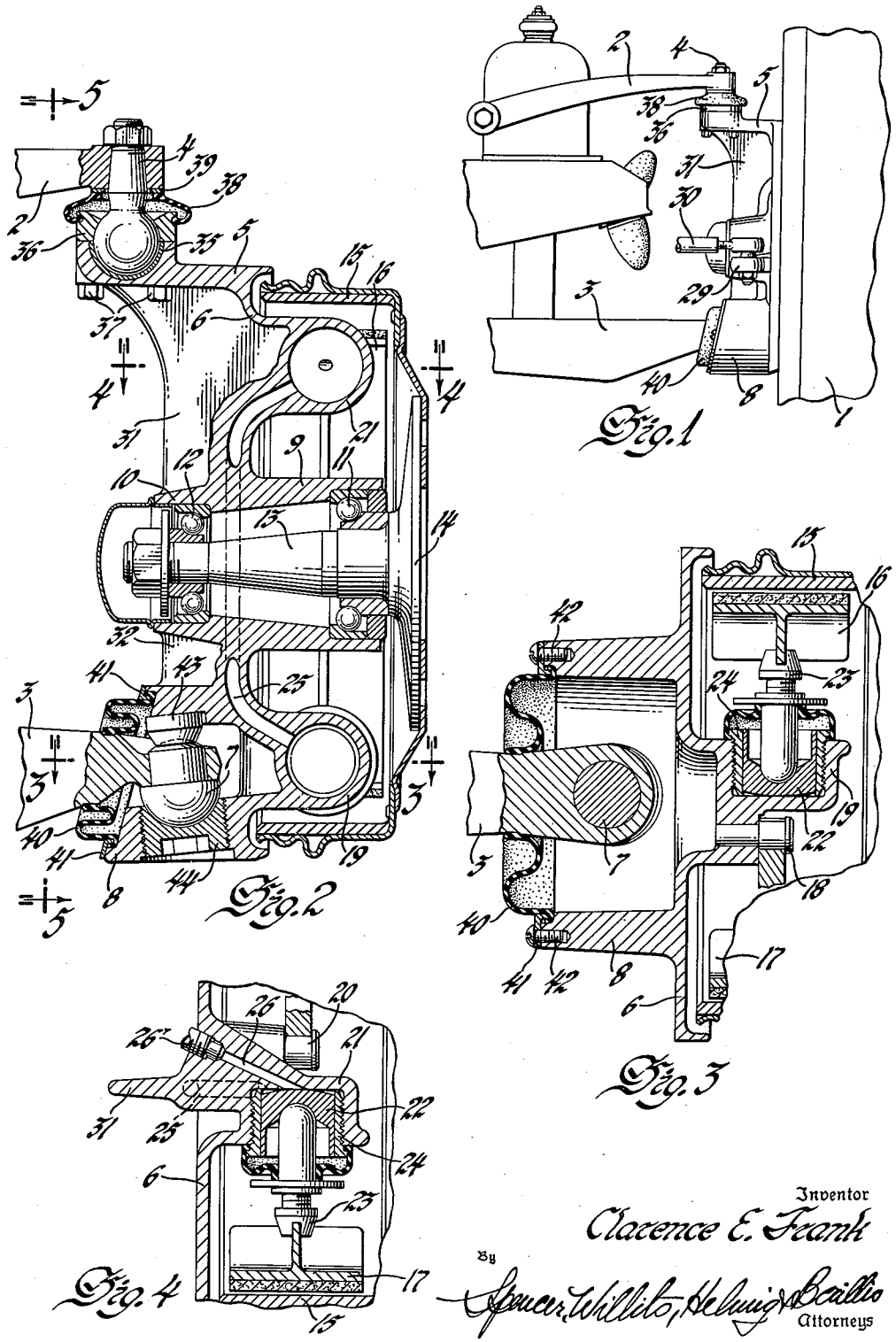
Inventor
Clarence E. Frank
By Spencer, Willito, Helwig & Baillio
Attorneys Jan. 1, 1952 C. E. FRANK 2,580,383
VEHICLE WHEEL SUPPORT
Filed Feb. 24, 1948 2 SHEETS—SHEET 2
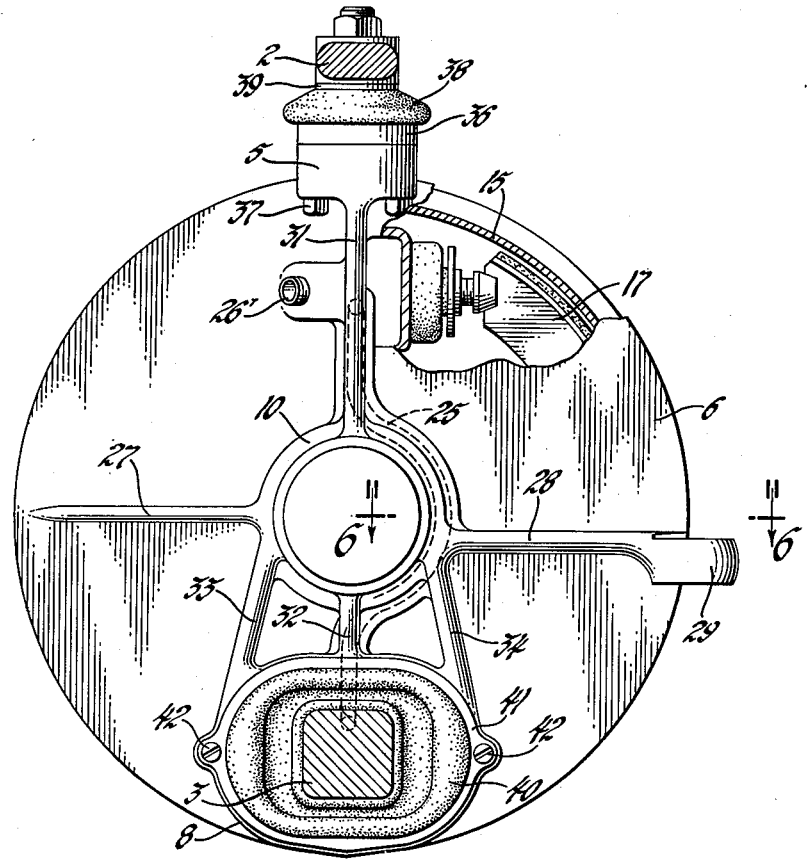
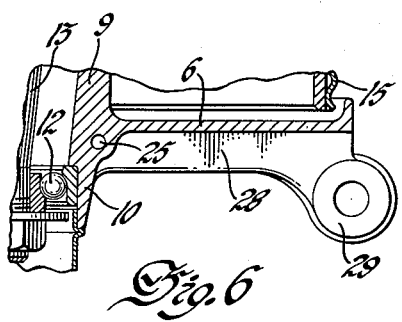
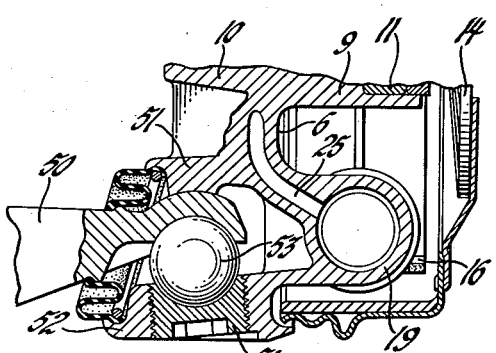
Inventor
Clarence E. Frank
By
Senca Willits, Helwig & Baillio
Attorneys Patented Jan. 1, 1952

2,580,383

UNITED STATES PATENT OFFICE 2,580,383

VEHICLE WHEEL SUPPORT

Clarence E. Frank, Fraser, Mich., assignor to General Motors Corporation, Detroit, Mich., a corporation of Delaware Application February 24, 1948, Serial No. 10,351

6 Claims. (Cl. 280—96.1)

This invention relates to an improvement in vehicle wheel supports. More particularly it deals with structure by which the automotive suspension system is joined to the rotatable road wheel.

In addition to providing a rotatable wheel bearing the improved structure affords a tie connection between upper and lower swinging control arms of an independent suspension system, there being ball joints to accommodate the swinging arm travel and also providing in the case of a dirigible or steerable road wheel a kingpin axis about a line intersecting the centers of the two ball joints. The spaced apart upper and lower ball joint connections and the centrally disposed wheel supporting hub are united by a circular web and by suitable ribbing on the rear face of the circular web.

Aside from the rear face ribbing which extends vertically between the hub and the upper and lower ball joint connections the circular web is further stiffened by radially extending horizontal ribs, one of which terminates conveniently in an eye for the attachment of a steering tie rod at a point spaced from the kingpin axis and this constitutes a steering lever arm. The circular web further serves as a backing plate for the rotatable brake drum and as a support for the usual drum engaging brake shoes whose actuating fluid cylinders are carried on the front face of the web and communicate with each other through a passage formed in the web itself. The wheel supporting structure as thus referred to lends itself readily to formation as a single unitary casting, preferably of aluminum or other lightweight metal.

While the unit is of lightweight and represents a saving in material it is also designed for ruggedness through mutual cooperation of the ribs and integral formations and for a minimum of machining operations with all surfaces requiring machining being readily accessible so that the net result includes an improved product at less cost.

The improved structure and its advantages will be better appreciated from an inspection of the accompanying drawings wherein Figure 1 is a front elevation of a form of independent wheel suspension embodying the invention; Figure 2 is a vertical section of the unitary wheel mounting structure; Figures 3 and 4 are sectional views taken on lines 3—3 and 4—4 of Figure 2; Figure 5 shows the rear face of the wheel support as viewed on line 5—5 of Figure 2; Figure 6 is a section on line 6—6 of Figure 5 and Figure 7 is a section of a portion of a wheel support containing a modified joint connection at the lower control arm.

In the drawing the support for the front road wheel 1 is pivoted at top and bottom on the outer ends of upper and lower control arms 2 and 3 whose inner ends are hinged to the chassis for vertical travel upon deflection of a load carrying spring, not shown, but which transmits load between the chassis and the lower control arm 3. Since the lower control arm carries the weight to the wheel and with the upper control arm 2 serving largely as a tie rod or radius arm it is desirable to join the lower arm relatively closer to the wheel axis. Thus the ball stud 4 at the top of the upper control arm 2 is socketed in a rearwardly extending pad 5 on a center which is outside or beyond the peripheral rim of the circular web 6 while the ball stud 7 on the lower control arm 3 is housed within a rearwardly projecting hollow boss or pocket 8 on a center inside the peripheral rim of the web 6 and closely adjacent to the central hub or wheel bearing support which includes axially cylindrical portions 9 and 10 projecting forwardly and rearwardly from the web 6. The only machining required in the hub is at the opposite shouldered ends which receive the bearing races of the usual antifriction bearing assemblies 11 and 12 for the rotatable wheel axle or spindle 13 whose outer flange 14 mounts the brake drum 15 and by means of conventional screw studs, not shown, also removably mounts the road wheel.

Enclosed by and engageable with the brake drum 15 are a pair of internal expanding brake shoes 16 and 17. In the embodiment shown in the drawing the brake shoe 17 is arranged to be pivotally anchored at its lower end on a pin 18 press fitted (see Figure 3) within an opening in a forwardly projecting boss 19 integral with the front face of the web 6 and the companion brake shoe 16 is anchored at its upper end on a pivot pin 20 (see Figure 4) similarly carried on a forwardly projecting boss 21 cast on the front face of the web 6. Brake expanders to engage the opposite or free ends of the pivoted shoes 16 and 17 are carried by and form a part of the upper and lower bosses 19 and 21 which have enlarged hollow pockets constituting pressure fluid cylinders.

Each cylinder is shown in the drawing as containing the conventional hydraulically actuated piston 22 terminating in a brake shoe engaging adjustable stud 23 and having slidable bearing in a wear sleeve or liner 24 threaded into the hollow boss 21. It will be noted that the formation of the screw threads in the hollow boss can be easily accomplished from the open end and furthermore that the web 6 can be formed at the time of casting with passages for liquid flow communication with both cylinders. One of such cored passages is shown at 25 extending vertically through the circular web 6 and around the central hub between the vertically spaced upper and lower cylinders for the equalization and distribution of liquid pressure within the pair of cylinders during use. Another passage 26 is shown leading laterally through the web to the upper cylinder and from a pipe fitting connection 26' provided for attachment with a conduit or flexible hose forming part of the hydraulic brake system. If desired an additional passage may be cored in the web for use in bleeding off air which may become entrapped in the hydraulic pressure lines.

Radially extending stiffening or reinforcing ribs integrally cast on the rear face of the circular web 6 are arranged both vertically and horizontally in regions requiring strengthening. Such ribbing includes the horizontal ribs 27 and 28 projecting forwardly and rearwardly from the central hub 10 with the rib 28 terminating in a lateral enlargement 29 having an aperture for reception of a ball stud or the like by which the dirigible wheel support is joined to a steering tie rod, such as shown at 30. Above the central rib a vertical rib 31 on the web joins the hub extension 10 with the pad 5. Because the major load transmission is between the relatively closely spaced hub 10 and lower control arm receiving boss 8 additional ribbing is provided below the hub comprising a central rib 32 as well as two ribs 33 and 34 joining both sides of the hub 10 with the opposite ends of the boss 8. Bearing in mind sturdiness for load transmission it will be noted that the lower control arm bearing not only is closer to the hub but is also nearer to the web than is the upper arm connection. Because of the difference in the loading of the upper and lower bearing balls the upper ball conveniently is spaced farther rearwardly from the web in order to afford an inclined kingpin axis extending between the ball centers.

As best seen in Figure 2 the end of the pad 5 has a half round socket in its upper surface containing a bearing liner or cup 35 for the ball end of the pivot stud 4 on the upper control arm 2. The ball is retained in the socket by a retainer collar 36 detachably bolted to the pad by corner studs 37. For sealing purposes a flexible sleeve 38 of rubber or the like terminates at one end in a bead to fit tightly and snap into an annular groove in the collar 36 and at its opposite end is bonded to a metal wear washer 39 which bears against the underside of the adjacent portion of the control arm. The rubber sleeve thus accommodates relative movement of the parts, retains lubricant for the bearing surfaces and excludes dirt and foreign matter. For the same purposes a bellows-like flexible sleeve 40 seals the space between the lower control arm 3 and the bearing pocket therefor. At one end it has a snap fit within an annular groove in the control arm and its opposite end is clamped by a marginal flange at the central aperture of a sheet metal retainer plate 41 mounted at opposite ends by screw studs 42. A flat surface of the roof of the hollow boss 8 is formed as a matter of convenience in a plane normal to the kingpin axis and seats a bearing cup or socket 43 for the upper spherical surface of the ball stud 7 whose shank is press fitted into the apertured end of the lower control arm. The lower half round bearing surface of the ball stud is pivotally seated in the concave inner end of a screw plug 44 adjustably threaded into an aperture extending laterally of the hollow boss 8 and through its bottom wall. For disassembly the seal retainer plate 41 is detached and the screw plug 44 is backed downwardly sufficiently to provide enough clearance between the bearing cup 43 and the upper ball surface for enabling the cup to be slid out of the boss and which then allows removal of the ball end from the hollow boss. Reversal of the procedure is followed when the parts are to be put together.

Obviously a spherical bearing surface may be formed directly on the end of each control arm but largely for manufacturing economy it is preferable to employ separately formed hardened ball ends. In Figure 7 the end of the lower control arm 50 is shown with upper convex and lower concave part spherical bearing surfaces to bear respectively on a concave bearing surface formed directly in the roof 51 of the hollow boss 52 and on a ball 53 serving as a combined bearing and arm retainer and being retained by the screw plug 54 threaded into the lower wall of the boss. Optionally the ball and plug may be formed in one piece. Here again the assembly and disassembly is effected through the adjustment of the screw plug 54.

From the above description it will be seen that the improved structure among other things combines in a simple and low cost single unit casting requiring a minimum of machining operation for replacing a number of heretofore separately formed and bolted together parts, including the steering knuckle, the brake cylinders and anchors, the steering arms, the brake dust shield and miscellaneous bolts, nuts and washers and which together will require comparatively more material, weight and expense for separate handling and manufacturing operations and procedures.

I claim:

1. A wheel carrier comprising a one-piece casting generally in the form of a circular web, a central hollow hub axially projecting on both sides of the web, top and bottom forwardly projecting hollow bosses to provide brake cylinders, a cored passage within the web vertically connecting the interiors of said hollow bosses, horizontal and vertical stiffening ribs on the rear face of said web, one of said horizontal ribs terminating in a tie rod connecting eye in spaced relation to said hollow hub, a control arm bearing pad extending rearwardly from the top of the web and integral with the web and the upper end of a vertical rib and a hollow boss joined to the lower ribbing on the rear face of the web and arranged to pivotally join with a lower wheel control arm.

2. A wheel support and brake backing plate formed as a unitary casting and comprising a hollow wheel spindle supporting hub, a circular web surrounding the hub, stiffening ribbing on the rear face of the web terminating above and below the hub in connecting formation for joining to upper and lower wheel suspension control arms and at one side of the hub in a connecting formation for joining to a steering tie rod, and top and bottom brake cylinder hollow bosses on the front face of said web, said hollow bosses being joined by a passage extending therebetween and through said web.

3. A wheel support and brake backing plate formed as a unitary casting including a circular web having a hollow central wheel mounting hub, suspension mounting pads projecting rearwardly from the web at the top and bottom thereof, stiffening ribbing on the rear face of the web merging into said suspension mounting pads, a pair of hollow bosses combined with the front face of the web to afford brake actuating cylinders and a cored passage extending through the web and communicating with the interiors of said hollow bosses.

4. A unitary one-piece wheel support and brake backing plate including a hollow hub for rotatably supporting a wheel, a circular web extending radially outwardly from the hub and having a cored passage therein extending through radial regions circumferentially spaced from one another and through a circular region adjacent the hub and a hollow formation in open communication with said cored passage and integral with the front face of the web to constitute a part of fluid actuating brake mechanism.

5. A wheel support structure, including a backing plate having a web, a centrally disposed wheel mounting hub projecting partially behind the web and a hollow boss on the rear of the web near the bottom thereof, stiffening ribbing merged with and integrating the hub and boss on the rear face of the web, a load transmitting suspension control arm having its outer terminal extending into said hollow boss and which terminal carries upper and lower spherical bearing surfaces, a bearing cup fitted to the boss for the upper bearing surface and a lower bearing surface socket in the form of a plug adjustably threaded in the wall of said boss.

6. In combination, a wheel support plate having a hollow boss on its rear face, a suspension control arm having its outer terminal housed within said hollow boss, spherical convex and concave bearing faces on the top and bottom, respectively, of said outer terminal, a bearing socket on the upper wall of the boss for the upper convex bearing face, said boss having an aperture in the bottom wall thereof, a plug threaded in said aperture and a combined arm retainer and bearing ball located by said plug in mating relation with said concave bearing face.

CLARENCE E. FRANK.

REFERENCES CITED

The following references are of record in the file of this patent:

UNITED STATES PATENTS

| Number | Name | Date |
|---|---|---|
| 875,358 | Landry | Dec. 31, 1907 |
| 1,776,488 | Charles | Sept. 23, 1930 |
| 1,901,924 | Nalle | Mar. 21, 1933 |
| 2,006,448 | Frank | July 2, 1935 |
| 2,069,253 | Kliesrath | Feb. 2, 1937 |
| 2,146,009 | Chase | Feb. 7, 1939 |
| 2,173,973 | Leighton | Sept. 26, 1939 |
| 2,193,753 | Yungling | Mar. 12, 1940 |
| 2,314,076 | Casner | Mar. 16, 1943 |

FOREIGN PATENTS

| Number | Country | Date |
|---|---|---|
| 466,595 | Great Britain | Mar. 31, 1936 |
| 834,525 | France | Aug. 22, 1938 |